(12) United States Patent
Nagasawa et al.

(10) Patent No.: US 12,142,306 B2
(45) Date of Patent: Nov. 12, 2024

(54) MAGNETIC SENSOR, MAGNETIC HEAD, AND MAGNETIC RECORDING DEVICE (71) Applicant: KABUSHIKI KAISHA TOSHIBA, Tokyo (JP)

(72) Inventors: Tazumi Nagasawa, Yokohama Kanagawa (JP); Satoshi Shirotori, Yokohama Kanagawa (JP); Akira Kikitsu, Yokohama Kanagawa (JP); Yoshihiro Higashi, Komatsu Ishikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/359,982

(22) Filed: Jul. 27, 2023

(65) Prior Publication Data

US 2024/0135961 A1 Apr. 25, 2024
US 2024/0233754 A9 Jul. 11, 2024

(30) Foreign Application Priority Data

Oct. 21, 2022 (JP) ................................ 2022-169280

(51) Int. Cl.
*G11B 5/11* (2006.01)
*G11B 5/127* (2006.01)
(Continued)

(52) U.S. Cl.
CPC .............. *G11B 5/11* (2013.01); *G11B 5/1272* (2013.01); *G11B 5/374* (2013.01); *G11B 5/3912* (2013.01)

(58) Field of Classification Search
None
See application file for complete search history.

(56) References Cited

U.S. PATENT DOCUMENTS 7,576,948 B2 8/2009 Covington et al.
8,174,799 B2 5/2012 Hoshiya et al.
(Continued)

FOREIGN PATENT DOCUMENTS

JP 2014203471 A * 10/2014 .......... G01R 33/098

OTHER PUBLICATIONS

Peigang Li et al., "Giant room temperature anomalous Hall effect and tunable topology in a ferromagnetic topological semimetal Co2MnAl," Nature Communications, DOI: 10.1038/s41467-020-17174-9, 8 pages (2020) (Year: 2020).*

(Continued)

*Primary Examiner* — William J Klimowicz
(74) *Attorney, Agent, or Firm* — Finnegan, Henderson, Farabow, Garrett & Dunner, LLP (57) ABSTRACT

According to one embodiment, a magnetic sensor includes first to sixth shields, first and second magnetic layers, a first member, and first to fourth terminals. The first magnetic layer is provided between the first shield and the second shield. The first magnetic layer is between the third shield and the fourth shield in the second direction. The second magnetic layer is provided between the first magnetic layer and the second shield. The second magnetic layer is between the fifth shield and the sixth shield in the second direction. The second magnetic layer is electrically connected to the fifth shield and the sixth shield. The first member includes a first region and a second region. The first region is provided between the third shield and the first magnetic layer. The second region is provided between the first magnetic layer and the fourth shield.

20 Claims, 5 Drawing Sheets

(51) Int. Cl.
*G11B 5/37* (2006.01)
*G11B 5/39* (2006.01)

(56) References Cited

U.S. PATENT DOCUMENTS

| | | | | |
|---|---|---|---|---|
| 8,922,950 | B2* | 12/2014 | Singleton | G01R 33/093 |
| | | | | 360/319 |
| 9,147,404 | B1* | 9/2015 | Luo | G11B 5/398 |
| 9,293,160 | B1* | 3/2016 | Mihajlovic | G11B 5/37 |
| 9,390,735 | B1* | 7/2016 | Wang | G11B 5/398 |
| 9,947,347 | B1* | 4/2018 | Van Der Heijden | G11B 5/372 |
| 10,777,222 | B1* | 9/2020 | Liu | G11B 5/3909 |
| 11,170,808 | B1 | 11/2021 | Liu et al. | |
| 11,682,417 | B1* | 6/2023 | Lam | G11B 5/315 |
| | | | | 360/123.12 |
| 2014/0049857 | A1* | 2/2014 | Isowaki | G11B 5/3932 |
| | | | | 428/811.2 |
| 2015/0221327 | A1* | 8/2015 | Isowaki | H10N 50/01 |
| | | | | 29/428 |
| 2019/0272849 | A1* | 9/2019 | Yamagishi | G11B 5/35 |
| 2020/0075048 | A1* | 3/2020 | Yamagishi | G11B 5/35 |
| 2022/0005498 | A1 | 1/2022 | Le et al. | |
| 2024/0135967 | A1* | 4/2024 | Nagasawa | G01R 33/0076 |

OTHER PUBLICATIONS

Muhammad Ikhlas et al., "Large anomalous Nernst effect at room temperature in a chiral antiferromagnet," Nature Physics, vol. 13, pp. 1085-1091, DOI: 10.1038/NPHYS4181 (2017) (Year: 2017).*

* cited by examiner

MAGNETIC SENSOR, MAGNETIC HEAD, AND MAGNETIC RECORDING DEVICE

CROSS-REFERENCE TO RELATED APPLICATIONS

This application is based upon and claims the benefit of priority from Japanese Patent Application No. 2022-169280, filed on Oct. 21, 2022; the entire contents of which are incorporated herein by reference.

FIELD

Embodiments of the invention generally relate to a magnetic sensor, a magnetic head, and a magnetic recording device.

BACKGROUND

There is a magnetic sensor using a magnetic layer. Information is recorded on a magnetic recording medium such as an HDD (Hard Disk Drive) using a magnetic head including the magnetic sensor. Magnetic sensors are desired to have improved resolution.

DETAILED DESCRIPTION

According to one embodiment, a magnetic sensor includes a first shield, a second shield, a third shield, a fourth shield, a fifth shield, a sixth shield, a first magnetic layer, a second magnetic layer, a first member, a first terminal, a second terminal, a third terminal, and a fourth terminal. The third shield is provided between the first shield and the second shield. The fourth shield is provided between the first shield and the second shield. A second direction from the third shield to the fourth shield crosses a first direction from the first shield to the second shield. The fifth shield is provided between the third shield and the second shield. The sixth shield is provided between the fourth shield and the second shield. A direction from the fifth shield to the sixth shield is along the second direction. The first magnetic layer is provided between the first shield and the second shield. The first magnetic layer is between the third shield and the fourth shield in the second direction. The second magnetic layer is provided between the first magnetic layer and the second shield. The second magnetic layer is between the fifth shield and the sixth shield in the second direction. The second magnetic layer is electrically connected to the fifth shield and the sixth shield. The first member includes a first region and a second region. The first region is provided between the third shield and the first magnetic layer. The second region is provided between the first magnetic layer and the fourth shield. The first terminal is electrically connected to the fifth shield. The second terminal is electrically connected to the sixth shield. The third terminal is electrically connected to the first magnetic layer. The fourth terminal electrically connected to the second magnetic layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

Figure 1:
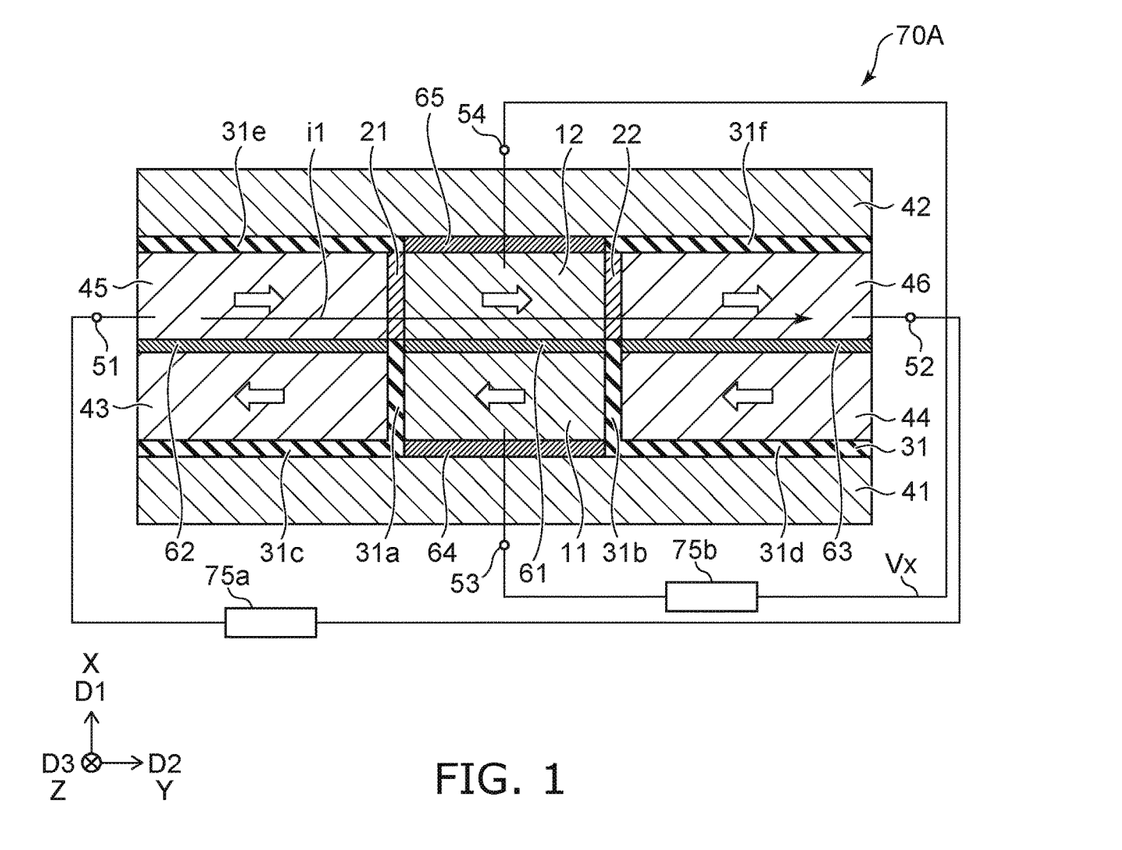
FIG. 1 is a schematic cross-sectional view illustrating a magnetic sensor according to a first embodiment.
Figure 2:
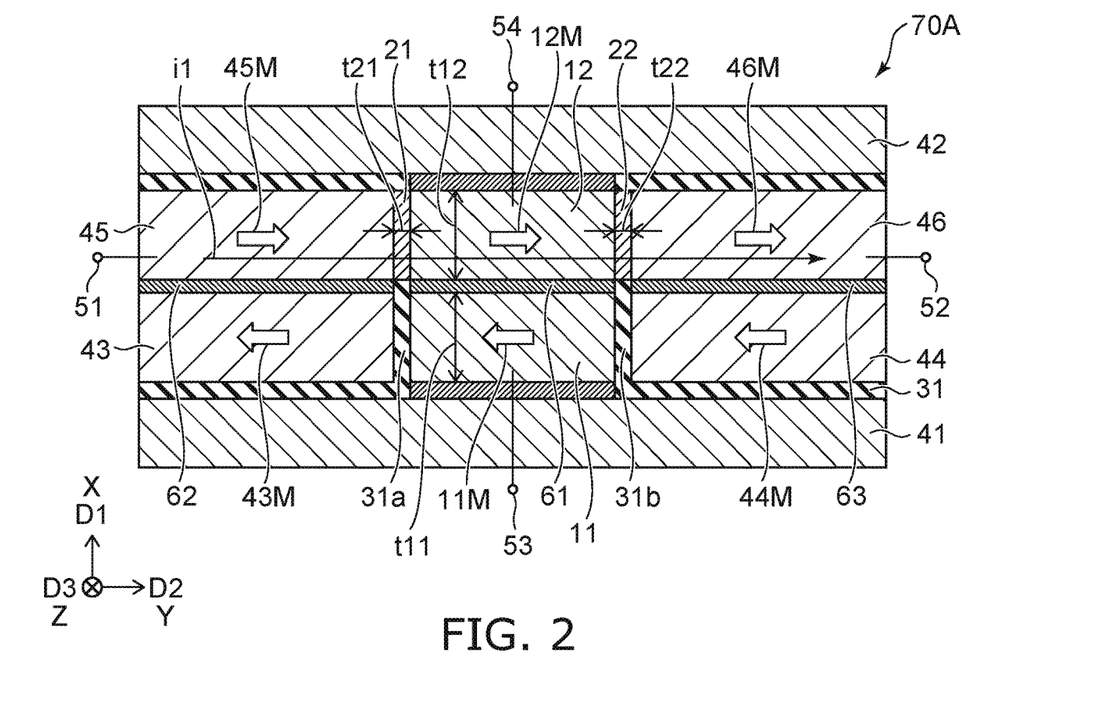
FIG. 2 is a schematic cross-sectional view illustrating the magnetic sensor according to the first embodiment.

FIG. 1 and FIG. 2 are schematic cross-sectional views illustrating a magnetic sensor according to the first embodiment.

As shown in FIG. 1, a magnetic sensor 70A according to the embodiment includes a first shield 41, a second shield 42, a third shield 43, a fourth shield 44, a fifth shield 45, a sixth shield 46, and a first magnetic layer 11, a second magnetic layer 12, a first member 31, a first terminal 51, a second terminal 52, a third terminal 53 and a fourth terminal 54. In this example, the magnetic sensor 70A includes a first conductive region 21 and a second conductive region 22.

The third shield 43 is provided between the first shield 41 and the second shield 42. The fourth shield 44 is provided between the first shield 41 and the second shield 42. A second direction D2 from the third shield 43 to the fourth shield 44 crosses a first direction D1 from the first shield 41 to the second shield 42.

The first direction D1 is defined as an X-axis direction. One direction perpendicular to the X-axis direction is defined as a Y-axis direction. A direction perpendicular to the X-axis direction and the Y-axis direction is defined as a Z-axis direction. The second direction D2 is, for example, the Y-axis direction.

The fifth shield 45 is provided between the third shield 43 and the second shield 42. The sixth shield 46 is provided between the fourth shield 44 and the second shield 42. A direction from the fifth shield 45 to the sixth shield 46 is along the second direction D2.

The first magnetic layer 11 is provided between the first shield 41 and the second shield 42. The first magnetic layer 11 is located between the third shield 43 and the fourth shield 44 in the second direction D2. The first magnetic layer 11 is, for example, a ferromagnetic layer.

The second magnetic layer 12 is provided between the first magnetic layer 11 and the second shield 42. The second magnetic layer 12 is located between the fifth shield 45 and the sixth shield 46 in the second direction D2. The second magnetic layer 12 is, for example, a ferromagnetic layer. The second magnetic layer 12 is electrically connected to, for example, the fifth shield 45 and the sixth shield 46.

The first conductive region 21 is provided between the fifth shield 45 and the second magnetic layer 12. The first conductive region 21 is electrically connected to the fifth shield 45 and the second magnetic layer 12. The first conductive region 21 is non-magnetic. The first conductive region 21 may be, for example, a continuous layer. The first conductive region 21 may be mesh-like, for example. The first conductive region 21 may include, for example, a plurality of discontinuous island regions.

The second conductive region 22 is provided between the second magnetic layer 12 and the sixth shield 46. The second conductive region 22 is electrically connected to the second magnetic layer 12 and the sixth shield 46. The second conductive region 22 is non-magnetic. The second conductive region 22 may be, for example, a continuous layer. The second conductive region 22 may be mesh-like, for example. The second conductive region 22 may include, for example, a plurality of discontinuous island regions. The first conductive region 21 and the second conductive region 22 may be provided or omitted as required.

The first member 31 includes a first region 31a and a second region 31b. The first region 31a is provided between the third shield 43 and the first magnetic layer 11. The second region 31b is provided between the first magnetic layer 11 and the fourth shield 44.

The first terminal 51 is electrically connected to the fifth shield 45. The second terminal 52 is electrically connected to the sixth shield 46. The first terminal 51 is electrically connected to the second magnetic layer 12 via the fifth shield 45 (and the first conductive region 21). The second terminal 52 is electrically connected to the second magnetic layer 12 via the sixth shield 46 (and the second conductive region 22).

The third terminal 53 is electrically connected to the first magnetic layer 11. For example, the third terminal 53 may be electrically connected to the first magnetic layer 11 via the first shield 41. The fourth terminal 54 is electrically connected to the second magnetic layer 12. For example, the fourth terminal 54 may be electrically connected to the second magnetic layer 12 via the second shield 42.

By such a magnetic sensor 70A, a detection target magnetic field can be detected with high spatial resolution. According to the embodiment, it is possible to provide a magnetic sensor capable of improving resolution.

For example, a first current i1 can be supplied between the first terminal 51 and the second terminal 52. For example, the magnetic sensor 70A may include a first circuit 75a. The first circuit 75a can supply a first current i1 between the first terminal 51 and the second terminal 52. The first current i1 flows through the second magnetic layer 12. The first current i1 includes a component along the second direction D2.

A voltage Vx between the third terminal 53 and the fourth terminal 54 can be detected in the magnetic sensor 70A. For example, the magnetic sensor 70A may include a second circuit 75b. The second circuit 75b can detect a value corresponding to the voltage Vx between the third terminal 53 and the fourth terminal 54.

The voltage Vx between the third terminal 53 and the fourth terminal 54 when the first current i1 flows between the first terminal 51 and the second terminal 52 can change according to the detection target magnetic field.

The detection target magnetic field includes a component along a third direction D3. The third direction D3 crosses a plane including the first direction D1 and the second direction D2. The third direction D3 is, for example, the Z-axis direction.

For example, in a first state, the detection target magnetic fields in the same direction are applied to both the first magnetic layer 11 and the second magnetic layer 12. In a second state, the direction of the detection target magnetic field applied to the first magnetic layer 11 is opposite to the direction of the detection target magnetic field applied to the second magnetic layer 12. In the magnetic sensor 70A, the voltage Vx in the first state differs from the voltage Vx in the second state. By detecting the change in the voltage Vx, the first state and the second state can be distinguished and detected. For example, a change in the orientation of the detection target magnetic field in the region between the first magnetic layer 11 and the second magnetic layer 12 is detected. For example, it is possible to detect a change in the detection target magnetic field in a small area. According to embodiments, improving the resolution is possible.

In the magnetic sensor 70A, the detection target magnetic field may be based on, for example, the orientation of magnetization recorded on a magnetic recording medium. For example, information recorded on the magnetic recording medium can be detected with high resolution.

In one example, a concentration of a first element in the first region 31a is higher than a concentration of the first element in the first conductive region 21, and a concentration of the first element in the second region 31b is higher than a concentration of the first element in the second conductive region 22. Alternatively, the first conductive region 21 and the second conductive region 22 do not include the first element. The first element includes at least one selected from the group consisting of oxygen and nitrogen.

For example, the first region 31a and the second region 31b include oxide, nitride or oxynitride. In one example, at least one of the first region 31a or the second region 31b further includes a second element including at least one selected from the group consisting of Si, Al, Ta, Hf, and Mg. The first region 31a and the second region 31b include, for example, at least one selected from the group consisting of silicon oxide, silicon nitride and aluminum oxide. The first region 31a and the second region 31b are, for example, insulative.

On the other hand, at least one of the first conductive region 21 or the second conductive region 22 includes at least one selected from the group consisting of Cu, Au, Ag, Pt, Al, Pd, Ta, Ru, Hf, W, Mo, Ir, Cr, Tb and Rh. At least one of the first conductive region 21 or the second conductive region 22 may include at least one selected from the group consisting of Au, Ta, Pt, Ru, Hf, W, Mo, Ir, Cr, Tb and Rh. In these materials, for example, the spin-orbit interaction is large. Unnecessary spin transfer is suppressed by using a material with a large spin-orbit interaction. The conductivity of the first conductive region 21 and the second conductive region 22 is higher than the conductivity of the first region 31a and the second region 31b.

For example, the direction of the magnetization of the second magnetic layer 12 is changed by the first current i1. The change in the direction of the magnetization direction of the second magnetic layer 12 includes, for example, a rotation component about the X-axis direction. On the other hand, the first current i1 does not substantially flow through the first magnetic layer 11. Therefore, the change in the orientation of the first magnetic layer 11 caused by the first current i1 has small effect on the voltage Vx. It is considered that the difference in the voltage Vx is caused by such an action and the action of the difference between the first state and the second state with respect to the detection target magnetic field.

As shown in FIG. 2, the first magnetic layer 11 has a first magnetization 11M. The second magnetic layer 12 has a second magnetization 12M. For example, the first magnetization 11M and the second magnetization 12M have components in the second direction D2. For example, the orientation of the first magnetization 11M is opposite to the orientation of the second magnetization 12M. For example, the first magnetic layer 11 may be antiferromagnetically coupled with the second magnetic layer 12.

For example, when the detection target magnetic field in the first state is applied to the first magnetic layer 11 and the second magnetic layer 12 that are antiferromagnetically coupled, the change in the magnetization directions of these magnetic layers is small. On the other hand, when the detection target magnetic field in the second state is applied to the antiferromagnetically coupled first magnetic layer 11 and second magnetic layer 12, the change in the magnetization directions of these magnetic layers is large. A change in the Z-axis component of magnetization due to a change in magnetization direction can be detected as a difference in change in voltage Vx based on the first current i1.

As shown in FIG. 2, the third shield 43 has a third magnetization 43M. The fourth shield 44 has a fourth magnetization 44M. The fifth shield 45 has a fifth magnetization 45M. The sixth shield 46 has a sixth magnetization 46M. For example, the orientation of the third magnetization 43M and the fourth magnetization 44M may be the same as the orientation of the first magnetization 11M. For example, the orientation of the fifth magnetization 45M and the sixth magnetization 46M may be the same as the orientation of the second magnetization 12M.

As shown in FIG. 1, the magnetic sensor 70A may further include a first intermediate layer 61, a second intermediate layer 62 and a third intermediate layer 63. The first intermediate layer 61 is provided between the first magnetic layer 11 and the second magnetic layer 12 and is non-magnetic. The second intermediate layer 62 is provided between the third shield 43 and the fifth shield 45 and is non-magnetic. The third intermediate layer 63 is provided between the fourth shield 44 and the sixth shield 46 and is non-magnetic.

In one example, at least one of the first intermediate layer 61, the second intermediate layer 62, or the third intermediate layer 63 includes Ru. At this time, the thickness of the at least one of these layers along the first direction D1 is not less than 0.1 nm and not more than 1.0 nm; or not less than 1.4 nm and not more than 2.2 nm; or not less than 2.6 nm and not more than 3.5 nm. By such a configuration it becomes easy to obtain antiferromagnetic coupling.

In another example, at least one of the first intermediate layer 61, the second intermediate layer 62 or the third intermediate layer 63 includes Ir. At this time, the thickness of the at least one of these layers along the first directions D1 is not less than 0.3 nm and not more than 0.8 nm; or not less than 1.1 nm and not more than 1.6 nm. By such a configuration, it becomes easy to obtain antiferromagnetic coupling. For example, it is easy to obtain antiferromagnetic coupling while suppressing leakage of the first current i1 to the first magnetic layer 11.

In the embodiment, a configuration corresponding to the peak (second peak, or first peak, etc.) of the RKKY (Ruderman-Kittel-Kasuya-Yosida) coupling may be applied to at least one of the first intermediate layer 61, the second intermediate layer 62, or the third intermediate layer 63.

As shown in FIG. 1, in the magnetic sensor 70A, the first member 31 may further include a third region 31c and a fourth region 31d. The third region 31c is provided between the first shield 41 and the third shield 43. The fourth region 31d is provided between the first shield 41 and the fourth shield 44.

For example, the third region 31c and the fourth region 31d are insulative. For example, the first region 31a may be continuous with the third region 31c. The second region 31b may be continuous with the fourth region 31d. The boundary between the first region 31a and the third region 31c may be clear or unclear. The boundary between the second region 31b and the fourth region 31d may be clear or unclear. For example, the material of the third region 31c may be the same as the material of the first region 31a. For example, the material of the fourth region 31d may be the same as the material of the second region 31b.

As shown in FIG. 1, the first member 31 may further include a fifth region 31e and a sixth region 31f. The fifth region 31e is provided between the fifth shield 45 and the second shield 42. The sixth region 31f is provided between the sixth shield 46 and the second shield 42. The fifth region 31e and the sixth region 31f are insulative.

As shown in FIG. 1, a portion of the first region 31a may be provided between the second intermediate layer 62 and the first intermediate layer 61. A portion of the second region 31b may be provided between the first intermediate layer 61 and the third intermediate layer 63.

As shown in FIG. 1, the magnetic sensor 70A may further include a fourth intermediate layer 64 and a fifth intermediate layer 65. The fourth intermediate layer 64 is provided between the first shield 41 and the first magnetic layer 11 and is non-magnetic. The fifth intermediate layer 65 is provided between the second magnetic layer 12 and the second shield 42 and is non-magnetic.

The fourth intermediate layer 64 and the fifth intermediate layer 65 include, for example, at least one selected from the group consisting of Ti, Cu, Ru, Ta, Cr, Hf, and Mg. Thereby, it becomes easier for the first current i1 to pass through the second magnetic layer 12. The fourth intermediate layer 64 and the fifth intermediate layer 65 may include, for example, a nitride or an oxide of at least one selected from the group consisting of Ti, Cu, Ru, Ta, Cr, Hf, and Mg.

As shown in FIG. 2, the thickness of the first conductive region 21 along the second direction D2 is defined as a first conductive region thickness t21. The thickness of the second conductive region 22 along the second direction D2 is defined as a second conductive region thickness t22. The first conductive region thickness t21 may be, for example, not less than 1.0 nm and not more than 5.0 nm. The second conductive region thickness t22 may be, for example, not less than 1.0 nm and not more than 5.0 nm. With such a thickness, for example, unnecessary spin transfer can be easily suppressed while obtaining magnetic interaction with the shield.

As shown in FIG. 2, the thickness of the first magnetic layer 11 along the first direction D1 is defined as a first magnetic layer thickness t11. The thickness of the second magnetic layer 12 along the first direction D1 is defined as a second magnetic layer thickness t12. In the embodiment, the first magnetic layer thickness t11 is not less than 2.0 nm and not more than 10.0 nm. The second magnetic layer thickness t12 is not less than 2.0 nm and not more than 10.0 nm.

In the magnetic sensor 70A, the stacked body provided between the first shield 41 and the second shield 42 includes the first magnetic layer 11, the first intermediate layer 61 and the second magnetic layer 12. The thickness of the stacked boy is thin. It is easy to obtain high resolution.

For example, the direction of magnetization of the second magnetic layer 12 changes depending on the detection target magnetic field. The change in the voltage Vx due to the change in the magnetization direction in the state where the first current i1 is supplied may be based on, for example, the Anomalous Hall Effect (AHE). For example, the second magnetic layer 12 has an anomalous Hall effect.

For example, the second magnetic layer 12 includes at least one selected from the group consisting of CoMnGa, CoMnAl, and FePt. In such materials, a large anomalous Hall effect can easily be obtained. For example, it is easy to obtain a large detection output. CoMnGa and CoMnAl are, for example, Heusler alloy materials.

In the embodiment, the first current i1 is suppressed from flowing through the first magnetic layer 11 by the first region 31a and the second region 31b. Therefore, even if the first magnetic layer 11 includes a material with a large anomalous Hall effect, the anomalous Hall effect is suppressed. The material of the first magnetic layer 11 may be the same as the material of the second magnetic layer 12.

In the embodiment, the anomalous Hall effect may be small in the first magnetic layer 11. Even if a part of the first current i1 flows through the first magnetic layer 11, adverse effects can be suppressed. For example, the material of the first magnetic layer 11 is preferably different from the material of the second magnetic layer 12. For example, the first magnetic layer 11 includes at least one selected from the group consisting of Co, Ni, and Fe. The first magnetic layer 11 may include, for example, at least one selected from the group consisting of CoFe, CoNiFe, NiFe, CoZrNb, FeN, FeSi, and FeAlSi. The first magnetic layer 11 may include, for example, a soft magnetic material having a relatively high saturation magnetic flux density and magnetic anisotropy in the in-plane direction. The anomalous Hall effect is relatively small in the above materials. For example, it is easy to increase the change (difference) in the voltage Vx between the first state and the second state.

As described below, the thickness of the first magnetic layer 11 (first magnetic layer thickness t11) may be different from the thickness of the second magnetic layer 12 (second magnetic layer thickness t12).

Figure 3:
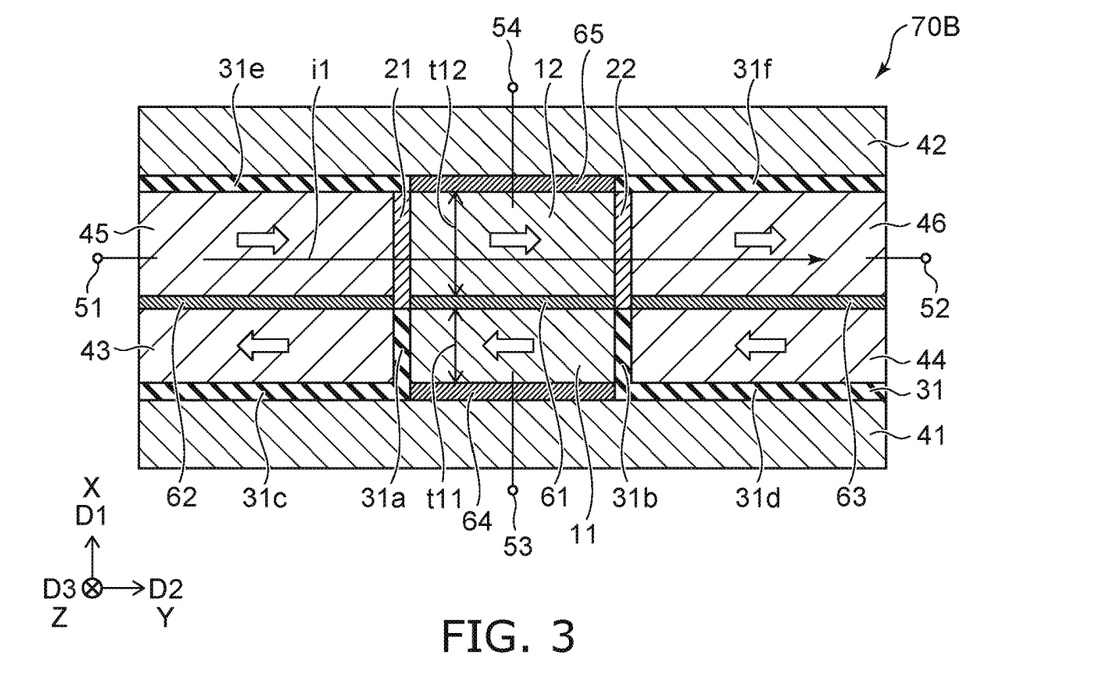
FIG. 3 is a schematic cross-sectional view illustrating the magnetic sensor according to the first embodiment.

FIG. 3 is a schematic cross-sectional view illustrating the magnetic sensor according to the first embodiment.

As shown in FIG. 3, in a magnetic sensor 70B according to the embodiment, the thickness of the first magnetic layer 11 (first magnetic layer thickness t11) is thinner than the thickness of the second magnetic layer 12 (second magnetic layer thickness t12). Except for this, the configuration of the magnetic sensor 70B may be the same as the configuration of the magnetic sensor 70A.

By the first magnetic layer thickness t11 being thin, the influence of the anomalous Hall effect in the first magnetic layer 11 is further suppressed. For example, it is easy to increase the change (difference) in the voltage Vx between the first state and the second state.

In the magnetic sensor 70B, the second magnetic layer 12 may include at least one selected from the group consisting of Co, Ni, and Fe, for example. The second magnetic layer 12 may include, for example, at least one selected from the group consisting of CoMnGa, CoMnAl, and FePt. CoMnGa and CoMnAl are Heusler alloy materials. The material of the first magnetic layer 11 may be different from the material of the second magnetic layer 12. For example, the first magnetic layer 11 may include at least one selected from the group consisting of Co, Ni, and Fe. The first magnetic layer 11 may include, for example, at least one selected from the group consisting of CoFe, CoNiFe, NiFe, CoZrNb, FeN, FeSi, and FeAlSi.

Second Embodiment

Figure 4:
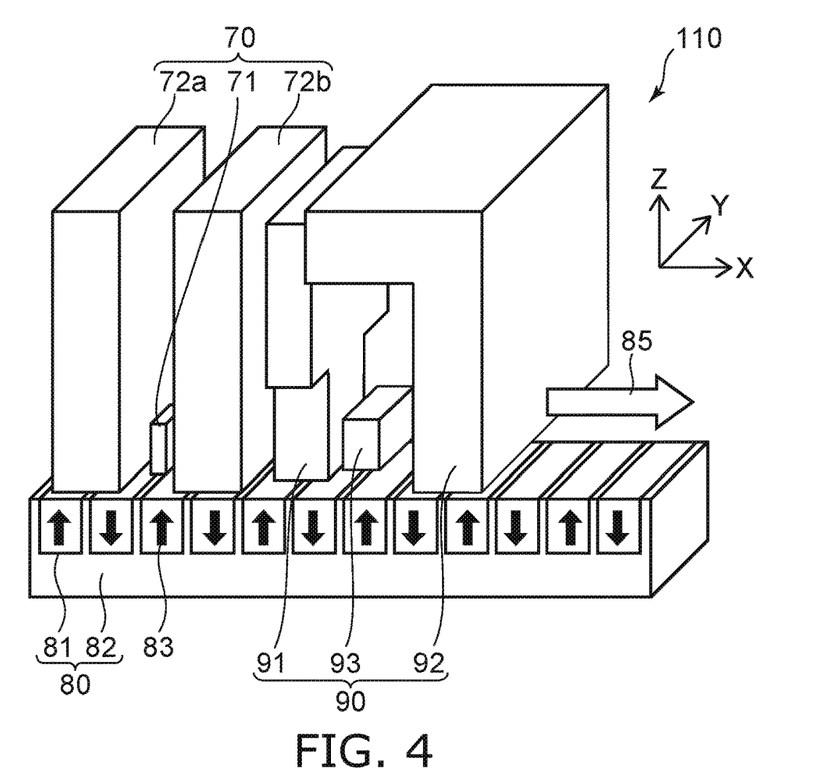
FIG. 4 is a schematic perspective view illustrating a magnetic head and a magnetic recording device according to a second embodiment.

FIG. 4 is a schematic perspective view illustrating a magnetic head and a magnetic recording device according to the second embodiment.

As shown in FIG. 4, a magnetic head 110 according to the embodiment includes a reproducing section 70. The reproducing section 70 includes a magnetic sensor (magnetic sensor 70A or magnetic sensor 70B) according to the first embodiment. The magnetic head 110 is used with magnetic recording medium 80. In this example, the magnetic head 110 includes a recording section 90. Information is recorded on the magnetic recording medium 80 by the recording section 90 of the magnetic head 110. Information recorded on the magnetic recording medium 80 is reproduced by the reproducing section 70.

The magnetic recording medium 80 includes, for example, a medium substrate 82 and a magnetic recording layer 81 provided on the medium substrate 82. The magnetization 83 of the magnetic recording layer 81 is controlled by the recording section 90. The recording section 90 includes, for example, a first magnetic pole 91 and a second magnetic pole 92. The first magnetic pole 91 is, for example, the main magnetic pole. The second magnetic pole 92 is, for example, a trailing shield. The recording section 90 may include a recording section element 93. The recording section element 93 may include a magnetic field control element, a high frequency oscillation element, or the like. The recording section element 93 may be omitted.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 can output a signal corresponding to the magnetization 83 of the magnetic recording layer 81.

The first reproducing magnetic shield 72a corresponds to, for example, the first shield 41 (see FIG. 1). The second reproducing magnetic shield 72b corresponds to, for example, the second shield 42 (see FIG. 1). The magnetic reproducing element 71 includes a stacked boy including the first magnetic layer 11, the second magnetic layer 12 and the first intermediate layer 61. In FIG. 4, the third shield 43, the fourth shield 44, the fifth shield 45, the sixth shield 46, etc. are omitted.

As shown in FIG. 4, the magnetic recording medium 80 moves relative to the magnetic head 110 in a medium movement direction 85. Information corresponding to the magnetization 83 of the magnetic recording layer 81 is controlled at an arbitrary position by the magnetic head 110. Information corresponding to the magnetization 83 of the magnetic recording layer 81 is reproduced at an arbitrary position by the magnetic head 110.

Figure 5:
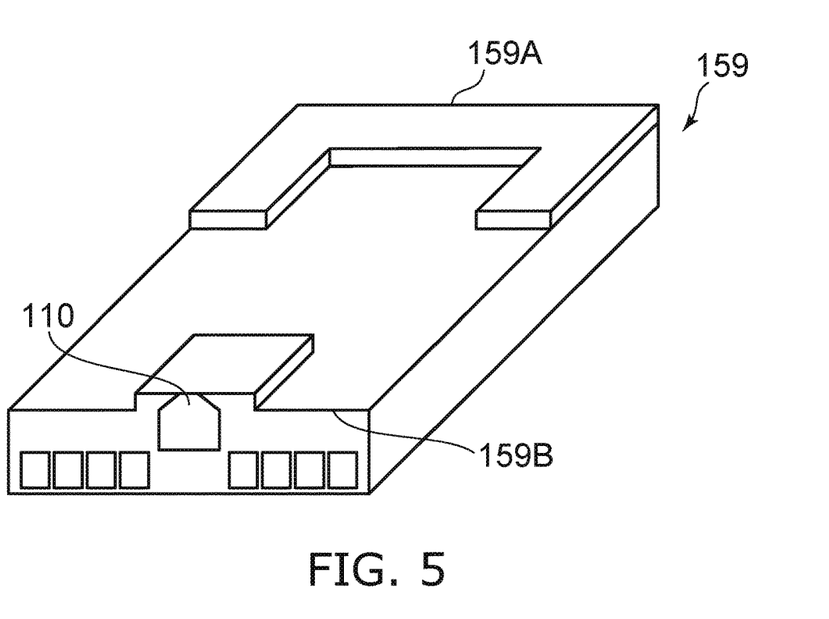
FIG. 5 is a schematic perspective view illustrating a portion of the magnetic recording device according to the embodiment.

FIG. 5 is a schematic perspective view illustrating a portion of the magnetic recording device according to the embodiment.

FIG. 5 illustrates a head slider.

The magnetic head 110 is provided on a head slider 159. The head slider 159 includes, for example, $Al_2O_3$/TiC and the like. The head slider 159 moves relative to the magnetic recording medium while floating or contacting the magnetic recording medium.

The head slider 159 includes, for example, an air inflow side 159A and an air outflow side 159B. The magnetic head 110 is arranged on the side surface of the air outflow side 159B of the head slider 159. As a result, the magnetic head 110 moves relative to the magnetic recording medium while floating or contacting the magnetic recording medium.

Figure 6:
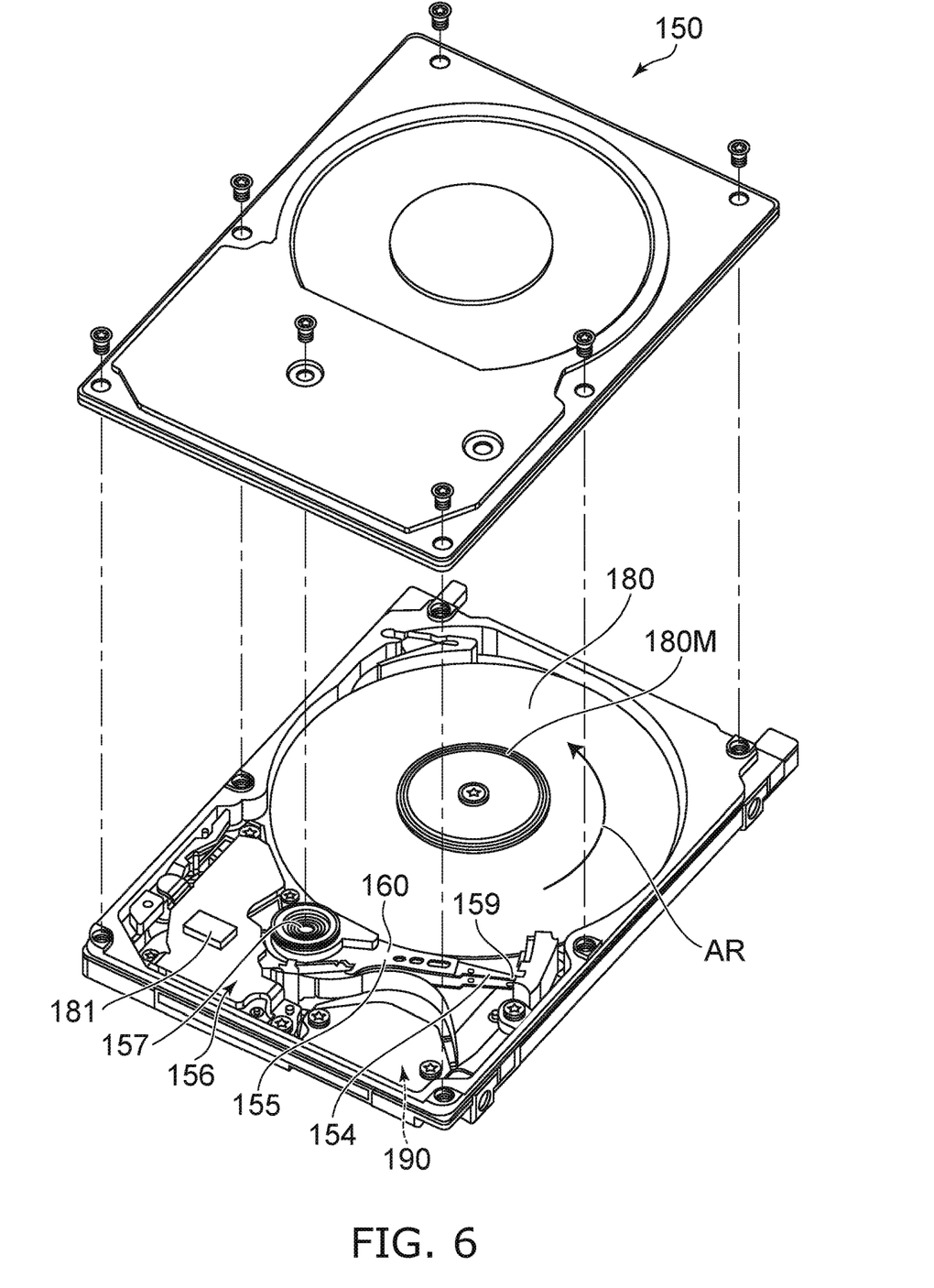
FIG. 6 is a schematic perspective view illustrating a magnetic recording device according to the embodiment.

FIG. 6 is a schematic perspective view illustrating a magnetic recording device according to the embodiment.

Figure 7A:
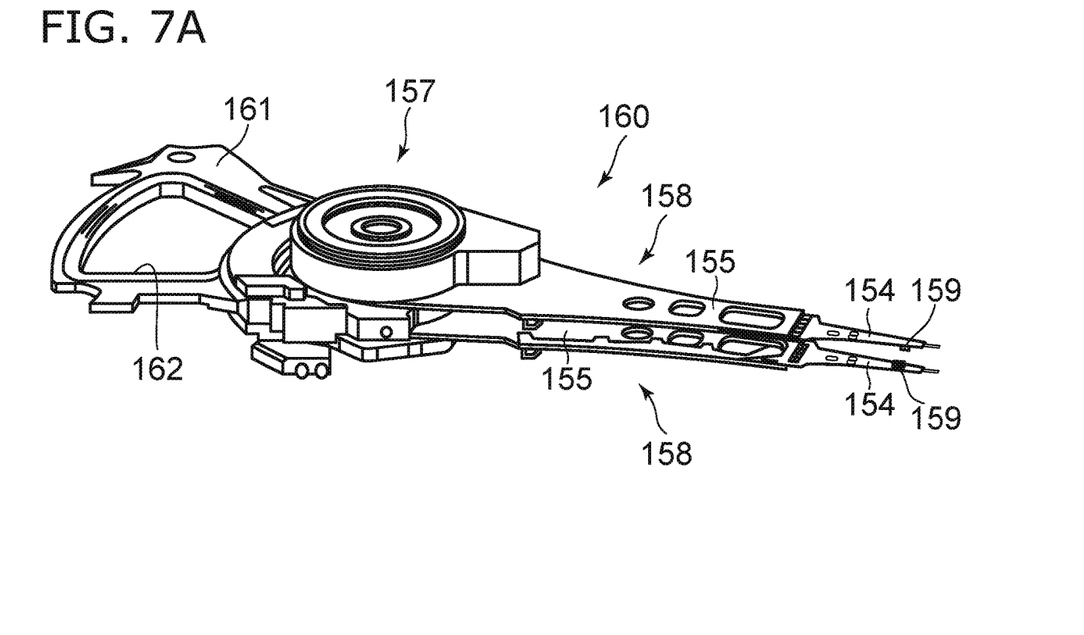
FIGS. 7A and 7B are schematic perspective views illustrating a portion of the magnetic recording device according to the embodiment.
Figure 7B:
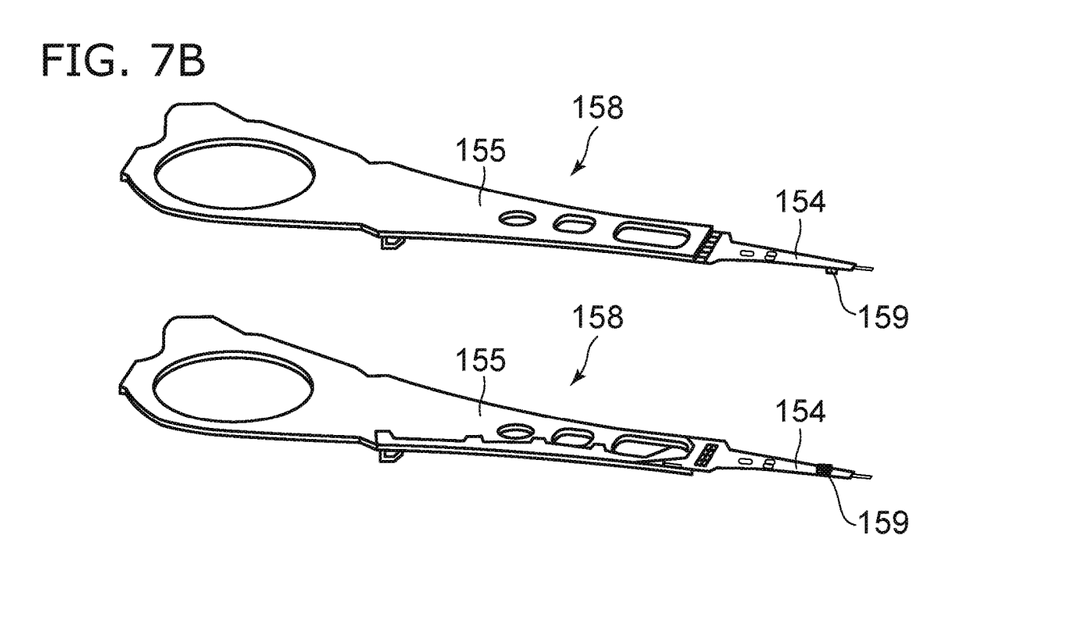

FIGS. 7A and 7B are schematic perspective views illustrating a portion of the magnetic recording device according to the embodiment.

The magnetic recording device may be a magnetic recording/reproducing device. As shown in FIG. 6, in the magnetic recording device 150 according to the embodiment, a rotary actuator is used. A recording medium disk 180 is mounted on a spindle motor 180M. The recording medium disk 180 is rotated in the direction of an arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of the thin film suspension 154. A magnetic head according to the embodiment is provided near the tip of the head slider 159.

When the recording medium disk 180 rotates, the pressing pressure by a suspension 154 and the pressure generated on the medium facing surface (ABS) of the head slider 159 are balanced. The distance between the media facing surface of the head slider 159 and the surface of the recording medium disk 180 is a predetermined fly height. In the embodiment, the head slider 159 may contact the recording medium disk 180. For example, a contact-sliding type may be applied.

The suspension 154 is connected to one end of an arm 155 (e.g., an actuator arm). The arm 155 includes, for example, a bobbin portion and the like. The bobbin portion holds a drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin portion of the arm 155. The magnetic circuit includes a permanent magnet and an opposed yoke. A drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

FIG. 7A illustrates a partial configuration of the magnetic recording device and is an enlarged perspective view of a head stack assembly 160.

FIG. 7B is a perspective view illustrating a magnetic head assembly (head gimbal assembly: HGA) 158 that is a portion of the head stack assembly 160.

As shown in FIG. 7A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 7B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, lead wires (not shown) for recording and reproducing signals. The suspension 154 may include, for example, a lead wire (not shown) for a heater for adjusting the fly height. The suspension 154 may include, for example, a lead wire (not shown) for a spin transfer torque oscillator. These lead wires and multiple electrodes provided on the magnetic head are electrically connected.

The magnetic recording device 150 is provided with a signal processor 190. The signal processor 190 records and reproduces a signal on a magnetic recording medium using a magnetic head. The input/output lines of the signal processor 190 are connected to, for example, the electrode pads of the head gimbal assembly 158, and are electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces a signal on a magnetic recording medium using a magnetic head.

For example, as the above-mentioned magnetic recording medium, the recording medium disk 180 is used. The movable part includes, for example, the head slider 159. The position controller includes, for example, the head gimbal assembly 158.

The embodiments may include the following configurations (e.g., technical proposals).

Configuration 1

A magnetic sensor, comprising:
 a first shield;
 a second shield;
 a third shield provided between the first shield and the second shield;
 a fourth shield provided between the first shield and the second shield, a second direction from the third shield to the fourth shield crossing a first direction from the first shield to the second shield;
 a fifth shield provided between the third shield and the second shield;

a sixth shield provided between the fourth shield and the second shield, a direction from the fifth shield to the sixth shield being along the second direction;

a first magnetic layer provided between the first shield and the second shield, the first magnetic layer being between the third shield and the fourth shield in the second direction;

a second magnetic layer provided between the first magnetic layer and the second shield, the second magnetic layer being between the fifth shield and the sixth shield in the second direction, the second magnetic layer being electrically connected to the fifth shield and the sixth shield;

a first member including a first region and a second region, the first region being provided between the third shield and the first magnetic layer, the second region being provided between the first magnetic layer and the fourth shield;

a first terminal electrically connected to the fifth shield;

a second terminal electrically connected to the sixth shield;

a third terminal electrically connected to the first magnetic layer; and a fourth terminal electrically connected to the second magnetic layer.

Configuration 2

The sensor according to Configuration 1, wherein
a voltage between the third terminal and the fourth terminal when a first current flows between the first terminal and the second terminal is configured to be changed according to a detection target magnetic field.

Configuration 3

The sensor according to Configuration 1 or 2, further comprising:

a first conductive region provided between the fifth shield and the second magnetic layer, the first conductive region being electrically connected to the fifth shield and the second magnetic layer, the first conductive region being non-magnetic; and a second conductive region provided between the second magnetic layer and the sixth shield, the second conductive region being electrically connected to the second magnetic layer and the sixth shield, the second conductive region being non-magnetic, a concentration of a first element in the first region being higher than a concentration of the first element in the first conductive region, and a concentration of the first element in the second region being higher than a concentration of the first element in the second conductive region; or the first conductive region and the second conductive region not including the first element, and the first element including at least one selected from the group consisting of oxygen and nitrogen.

Configuration 4

The sensor according to Configuration 3, wherein
at least one of the first region or the second region further includes a second element including at least one selected from the group consisting of Si, Al, Ta, Hf, and Mg.

Configuration 5

The sensor according to Configuration 3 or 4, wherein
at least one of the first conductive region or the second conductive region includes at least one selected from the group consisting of Au, Ta, Pt, Ru, Hf, W, Mo, Ir, Cr, Tb, and Rh.

Configuration 6

The sensor according to any one of Configurations 1-5, further comprising:

a first intermediate layer provided between the first magnetic layer and the second magnetic layer, the first intermediate layer being non-magnetic;

a second intermediate layer provided between the third shield and the fifth shield, the second intermediate layer being non-magnetic; and a third intermediate layer provided between the fourth shield and the sixth shield, the third intermediate layer non-magnetic, at least one of the first intermediate layer, the second intermediate layer, or the third intermediate layer including Ru, and a thickness of the at least one along the first directions being not less than 0.1 nm and not more than 1.0 nm; or not less than 1.4 nm and not more than 2.2 nm; or not less than 2.6 nm and not more than 3.5 nm.

Configuration 7

The sensor according to any one of Configurations 1-5, further comprising:

a first intermediate layer provided between the first magnetic layer and the second magnetic layer, the first intermediate layer being non-magnetic;

a second intermediate layer provided between the third shield and the fifth shield, the second intermediate layer being non-magnetic; and a third intermediate layer provided between the fourth shield and the sixth shield, the third intermediate layer non-magnetic, at least one of the first intermediate layer, the second intermediate layer, or the third intermediate layer including Ir, and a thickness of the at least one along the first directions being not less than 0.3 nm and not more than 0.8 nm; or not less than 1.1 nm and no more than 1.6 nm.

Configuration 8

The sensor according to any one of Configurations 1-5, wherein
the first magnetic layer is antiferromagnetically coupled with the second magnetic layer.

Configuration 9

The sensor according to any one of Configurations 1-8, wherein
the second magnetic layer includes at least one selected from the group consisting of CoMnGa, CoMnAl, and FePt.

Configuration 10

The sensor according to any one of Configurations 1-9, wherein
a material of the first magnetic layer is different from a material of the second magnetic layer.

Configuration 11

The sensor according to Configuration 9 or 10, wherein
a first magnetic layer thickness along the first direction of the first magnetic layer is thinner than a second magnetic layer thickness along the first direction of the second magnetic layer.

Configuration 12

The sensor according to any one of Configurations 1-11, wherein
the first member further includes:
a third region provided between the first shield and the third shield; and
a fourth region provided between the first shield and the fourth shield, and
the third region and the fourth region are insulative.

Configuration 13
The sensor according to Configuration 12, wherein
the first region is continuous with the third region, and
the second region is continuous with the fourth region.

Configuration 14
The sensor according to any one of Configurations 1-13, wherein
the first member further includes:
a fifth region provided between the fifth shield and the second shield; and
a sixth region provided between the sixth shield and the second shield, and
the fifth region and the sixth region are insulative.

Configuration 15
The sensor according to any one of Configurations 1-14, further comprising:
a fourth intermediate layer provided between the first shield and the first magnetic layer, the fourth intermediate layer being non-magnetic; and
a fifth intermediate layer provided between the second magnetic layer and the second shield, the fifth intermediate layer being non-magnetic, and
the fourth intermediate layer and the fifth intermediate layer including at least one selected from the group consisting of Ti, Cu, Ru, Ta, Cr, Hf, and Mg.

Configuration 16
The sensor according to any one of Configurations 3-5, wherein
a first conductive region thickness along the second direction of the first conductive region is not less than 1.0 nm and not more than 5.0 nm, and
a second conductive region thickness along the second direction of the second conductive region is not less than 1.0 nm and not more than 5.0 nm.

Configuration 17
A magnetic sensor, comprising:
a first shield;
a second shield;
a third shield provided between the first shield and the second shield;
a fourth shield provided between the first shield and the second shield, a second direction from the third shield to the fourth shield crossing a first direction from the first shield to the second shield;
a fifth shield provided between the third shield and the second shield;
a sixth shield provided between the fourth shield and the second shield, a direction from the fifth shield to the sixth shield being along the second direction;
a first magnetic layer provided between the first shield and the second shield, the first magnetic layer being between the third shield and the fourth shield in the second direction;
a second magnetic layer provided between the first magnetic layer and the second shield, the second magnetic layer being between the fifth shield and the sixth shield in the second direction, the second magnetic layer being electrically connected to the fifth shield and the sixth shield, the second magnetic layer being antiferromagnetically coupled with the first magnetic layer;
a first member including a first region and a second region, the first region being provided between the third shield and the first magnetic layer, the second region being provided between the first magnetic layer and the fourth shield;
a first terminal electrically connected to the fifth shield;
a second terminal electrically connected to the sixth shield;
a third terminal electrically connected to the first magnetic layer; and
a fourth terminal electrically connected to the second magnetic layer.

Configuration 18
The sensor according to any one of Configurations 1-17, wherein
the second magnetic layer has an Anomalous Hall Effect.

Configuration 19
A magnetic head, comprising:
the magnetic sensor according to any one of Configurations 1-18

Configuration 20
A magnetic recording device, comprising:
the magnetic head according to Configuration 19; and
a magnetic recording medium,
the magnetic sensor being configured to reproduce information recorded on the magnetic recording medium.

According to the embodiments, it is possible to provide a magnetic sensor, a magnetic head, and a magnetic recording device capable of improving resolution.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic sensors, magnetic heads and magnetic recording devices such as shields, magnetic layers, conductive regions, members, intermediate layers and terminals, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic sensors, magnetic heads, and magnetic recording devices practicable by an appropriate design modification by one skilled in the art based on the magnetic sensors, magnetic heads, and magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic sensor, comprising:
a first shield;
a second shield;
a third shield provided between the first shield and the second shield;
a fourth shield provided between the first shield and the second shield, a second direction from the third shield to the fourth shield crossing a first direction from the first shield to the second shield;
a fifth shield provided between the third shield and the second shield;
a sixth shield provided between the fourth shield and the second shield, a direction from the fifth shield to the sixth shield being along the second direction;
a first magnetic layer provided between the first shield and the second shield, the first magnetic layer being between the third shield and the fourth shield in the second direction;
a second magnetic layer provided between the first magnetic layer and the second shield, the second magnetic layer being between the fifth shield and the sixth shield in the second direction, the second magnetic layer being electrically connected to the fifth shield and the sixth shield;
a first member including a first region and a second region, the first region being provided between the third shield and the first magnetic layer, the second region being provided between the first magnetic layer and the fourth shield;
a first terminal electrically connected to the fifth shield;
a second terminal electrically connected to the sixth shield;
a third terminal electrically connected to the first magnetic layer; and
a fourth terminal electrically connected to the second magnetic layer.

2. The sensor according to claim 1, wherein
a voltage between the third terminal and the fourth terminal when a first current flows between the first terminal and the second terminal is configured to be changed according to a detection target magnetic field.

3. The sensor according to claim 1, further comprising:
a first conductive region provided between the fifth shield and the second magnetic layer, the first conductive region being electrically connected to the fifth shield and the second magnetic layer, the first conductive region being non-magnetic; and
a second conductive region provided between the second magnetic layer and the sixth shield, the second conductive region being electrically connected to the second magnetic layer and the sixth shield, the second conductive region being non-magnetic,
a concentration of a first element in the first region being higher than a concentration of the first element in the first conductive region, and a concentration of the first element in the second region being higher than a concentration of the first element in the second conductive region; or the first conductive region and the second conductive region not including the first element, and
the first element including at least one selected from the group consisting of oxygen and nitrogen.

4. The sensor according to claim 3, wherein
at least one of the first region or the second region further includes a second element including at least one selected from the group consisting of Si, Al, Ta, Hf, and Mg.

5. The sensor according to claim 3, wherein
at least one of the first conductive region or the second conductive region includes at least one selected from the group consisting of Au, Ta, Pt, Ru, Hf, W, Mo, Ir, Cr, Tb, and Rh.

6. The sensor according to claim 3, wherein
a first conductive region thickness along the second direction of the first conductive region is not less than 1.0 nm and not more than 5.0 nm, and
a second conductive region thickness along the second direction of the second conductive region is not less than 1.0 nm and not more than 5.0 nm.

7. The sensor according to claim 1, further comprising:
a first intermediate layer provided between the first magnetic layer and the second magnetic layer, the first intermediate layer being non-magnetic;
a second intermediate layer provided between the third shield and the fifth shield, the second intermediate layer being non-magnetic; and
a third intermediate layer provided between the fourth shield and the sixth shield, the third intermediate layer non-magnetic,
at least one of the first intermediate layer, the second intermediate layer, or the third intermediate layer including Ru, and
a thickness of the at least one along the first directions being not less than 0.1 nm and not more than 1.0 nm; or not less than 1.4 nm and not more than 2.2 nm; or not less than 2.6 nm and not more than 3.5 nm.

8. The sensor according to claim 1, further comprising:
a first intermediate layer provided between the first magnetic layer and the second magnetic layer, the first intermediate layer being non-magnetic;
a second intermediate layer provided between the third shield and the fifth shield, the second intermediate layer being non-magnetic; and
a third intermediate layer provided between the fourth shield and the sixth shield, the third intermediate layer non-magnetic,
at least one of the first intermediate layer, the second intermediate layer, or the third intermediate layer including Ir, and
a thickness of the at least one along the first directions being not less than 0.3 nm and not more than 0.8 nm; or not less than 1.1 nm and no more than 1.6 nm.

9. The sensor according to claim 1, wherein
the first magnetic layer is antiferromagnetically coupled with the second magnetic layer.

10. The sensor according to claim 1, wherein
the second magnetic layer includes at least one selected from the group consisting of CoMnGa, CoMnAl, and FePt.

11. The sensor according to claim 10, wherein
a first magnetic layer thickness along the first direction of the first magnetic layer is thinner than a second magnetic layer thickness along the first direction of the second magnetic layer.

12. The sensor according to claim 1, wherein
a material of the first magnetic layer is different from a material of the second magnetic layer.

13. The sensor according to claim 1, wherein
the first member further includes:
- a third region provided between the first shield and the third shield; and
- a fourth region provided between the first shield and the fourth shield, and the third region and the fourth region are insulative.

14. The sensor according to claim 13, wherein
the first region is continuous with the third region, and
the second region is continuous with the fourth region.

15. The sensor according to claim 1, wherein
the first member further includes:
- a fifth region provided between the fifth shield and the second shield; and
- a sixth region provided between the sixth shield and the second shield, and the fifth region and the sixth region are insulative.

16. The sensor according to claim 1, further comprising:
- a fourth intermediate layer provided between the first shield and the first magnetic layer, the fourth intermediate layer being non-magnetic; and
- a fifth intermediate layer provided between the second magnetic layer and the second shield, the fifth intermediate layer being non-magnetic, and the fourth intermediate layer and the fifth intermediate layer including at least one selected from the group consisting of Ti, Cu, Ru, Ta, Cr, Hf, and Mg.

17. The sensor according to claim 1, wherein
the second magnetic layer has an Anomalous Hall Effect.

18. A magnetic head, comprising:
the magnetic sensor according to claim 1.

19. A magnetic recording device, comprising:
the magnetic head according to claim 18; and
a magnetic recording medium,
the magnetic sensor being configured to reproduce information recorded on the magnetic recording medium.

20. A magnetic sensor, comprising:
- a first shield;
- a second shield;
- a third shield provided between the first shield and the second shield;
- a fourth shield provided between the first shield and the second shield, a second direction from the third shield to the fourth shield crossing a first direction from the first shield to the second shield;
- a fifth shield provided between the third shield and the second shield;
- a sixth shield provided between the fourth shield and the second shield, a direction from the fifth shield to the sixth shield being along the second direction;
- a first magnetic layer provided between the first shield and the second shield, the first magnetic layer being between the third shield and the fourth shield in the second direction;
- a second magnetic layer provided between the first magnetic layer and the second shield, the second magnetic layer being between the fifth shield and the sixth shield in the second direction, the second magnetic layer being electrically connected to the fifth shield and the sixth shield, the second magnetic layer being antiferromagnetically coupled with the first magnetic layer;
- a first member including a first region and a second region, the first region being provided between the third shield and the first magnetic layer, the second region being provided between the first magnetic layer and the fourth shield;
- a first terminal electrically connected to the fifth shield;
- a second terminal electrically connected to the sixth shield;
- a third terminal electrically connected to the first magnetic layer; and
- a fourth terminal electrically connected to the second magnetic layer.

* * * * *